United States Patent

Rose et al.

[11] Patent Number: 5,342,084
[45] Date of Patent: Aug. 30, 1994

[54] RETENTION STRUCTURE FOR A FLANGE BASED INFLATOR OF AN AIRBAG RESTRAINT ASSEMBLY

[75] Inventors: Larry D. Rose, Layton; Donald R. Lauritzen, Hyrum, both of Utah

[73] Assignee: Morton International, Inc., Chicago, Ill.

[21] Appl. No.: 86,718

[22] Filed: Jul. 2, 1993

[51] Int. Cl.⁵ ............................................. B60R 21/22
[52] U.S. Cl. ................................. 280/728A; 280/732
[58] Field of Search ........... 280/728 R, 728 A, 730 R, 280/732, 736, 741

[56] References Cited

U.S. PATENT DOCUMENTS

| | | | |
|---|---|---|---|
| 3,787,010 | 1/1974 | Meranshian et al. | 244/146 |
| 4,153,273 | 5/1979 | Risko | 280/728 A |
| 4,877,264 | 10/1989 | Cuevas | 280/738 |
| 4,915,410 | 4/1990 | Bachelder | 280/732 |
| 5,033,772 | 7/1991 | Frantom et al. | 280/737 |
| 5,069,480 | 12/1991 | Good | 280/743 |
| 5,096,222 | 3/1992 | Komerska et al. | 280/732 |
| 5,121,941 | 6/1992 | Mihm et al. | 280/732 |
| 5,135,252 | 8/1992 | Suran et al. | 280/732 |
| 5,149,130 | 9/1992 | Wooley et al. | 280/743 |

*Primary Examiner*—Karin L. Tyson
*Attorney, Agent, or Firm*—George W. Rauchfuss; Gerald K. White

[57] ABSTRACT

An inflator, which is shorter than a reaction can of an airbag restraint assembly and which has a flanged base at one end thereof, is mounted in the reaction can. The mounting structure for the flange based inflator has a generally circular open cylindrical shape, with its sidewall terminated on one end in a mounting flange and terminating in an inwardly tapered conical flange at the other end. The mounting structure is located in an access opening in an end wall of the reaction can, with the inwardly tapered conical flange frictionally engaging and holding the flanged base of the inflator in the reaction can by biased radially compressive force, thereby providing essentially rattle- and squeak-free retention of the flange based inflator in the reaction can in an appropriately positioned and centered manner.

13 Claims, 1 Drawing Sheet

RETENTION STRUCTURE FOR A FLANGE BASED INFLATOR OF AN AIRBAG RESTRAINT ASSEMBLY

FIELD OF THE INVENTION

This invention relates to vehicle airbag restraint systems, and more particularly to a mounting structure for mounting an inflator which is shorter than a reaction can of an airbag restraint assembly in the reaction can of such an assembly.

BACKGROUND OF THE INVENTION

A vehicular airbag restraint system generally includes a pyrotechnic inflator which may comprise a cylindrical housing which encloses some form of gas generating material which, when ignited, generates a non-toxic inert gas under pressure within the housing. The inflator, along with an uninflated, folded airbag which is to be inflated by the gas, is disposed in an internal cavity of a reaction can along with means to control deployment. In an emergency situation inert gas is generated in the inflator housing and the gas is directed rapidly through a plurality of nozzles formed in the inflator housing and into the airbag to force the airbag out of the reaction can to inflate the airbag. One location for such a vehicular airbag restraint system is in the instrument panel or dashboard on the passenger side of the vehicle for passive protection of a passenger in the vehicle.

Some inflators are constructed with a flanged base at one end of the cylindrical housing. In many cases, packaging and weight limitations may require airbag inflators to be shorter than the reaction cans in which they are housed. This situation requires an inflator to reaction can interface that is cost effective, durable and squeak- and rattle-free.

SUMMARY OF THE INVENTION

Accordingly, it is an object of this invention to provide a new and improved mounting structure for mounting a flange based inflator, which is shorter than a reaction can, in the reaction can of an airbag restraint system which structure produces a mounting interface that is squeak and rattle resistant and provides a seal against the escape of gas on deployment of an airbag of the assembly.

Another object of this invention is to provide a new and improved structure for mounting an inflator in a reaction can of a vehicle airbag restraint system which is easy to install, cost effective, and durable as well as squeak- and rattle-free.

In carrying out this invention in one illustrative embodiment thereof, a mounting structure is provided for mounting an inflator in a reaction can wherein the inflator is shorter than the reaction can of a airbag restraint system in which the inflator is mounted. The inflator, which is to be positioned in a cavity of a reaction can through an access opening in one end of said reaction can, has a flanged base on a first end thereof, generally the squib end of the inflator. A mounting means is located or positioned in the opening of the reaction can, said mounting means being a generally right circular cylindrical shaped, open tube, the sidewall of which terminates on one end thereof with a circular mounting flange extending radially outward from the sidewall and on the other end thereof terminates in an inwardly tapered conical flange, preferably, in a joggle terminating in said inwardly tapered conical flange. The mounting means is located or positioned in the access opening at one end of the reaction can with the mounting flange abutting the exterior side of the reaction can end wall having the access opening. The mounting means extends into the reaction can through the access opening in the reaction can end wall. As installed, the sidewall, joggle, and inwardly tapered conical flange extend into the cavity in the reaction can. On installation of the inflator, the end of the inflator opposite the flanged base is passed through the opening in the mounting means and through the joggle and inwardly tapered conical flange until the flanged base on the end of the inflator rests against the joggle. The inward taper of the conical flange provides a lead-in for press fit of the inflator housing to the conical flange, thereby providing an anti-rattle retention of the flanged based inflator in the reaction can cavity.

BRIEF DESCRIPTION OF THE DRAWINGS

The invention, together with further objects, aspects, features and advantages thereof will be more clearly understood from the following description taken in connection with the accompanying drawings.

DETAILED DESCRIPTION OF THE INVENTION

Figure 2:
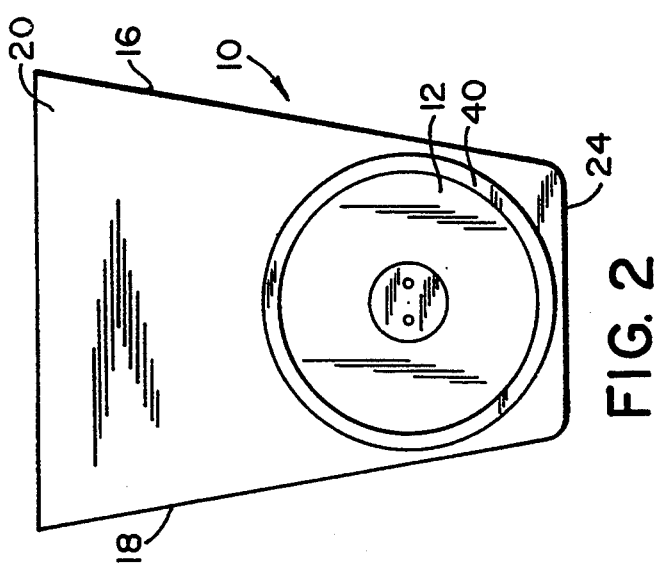
FIG. 2 is a side elevational view of FIG. 1 viewed from the right side of FIG. 1.
Figure 1:
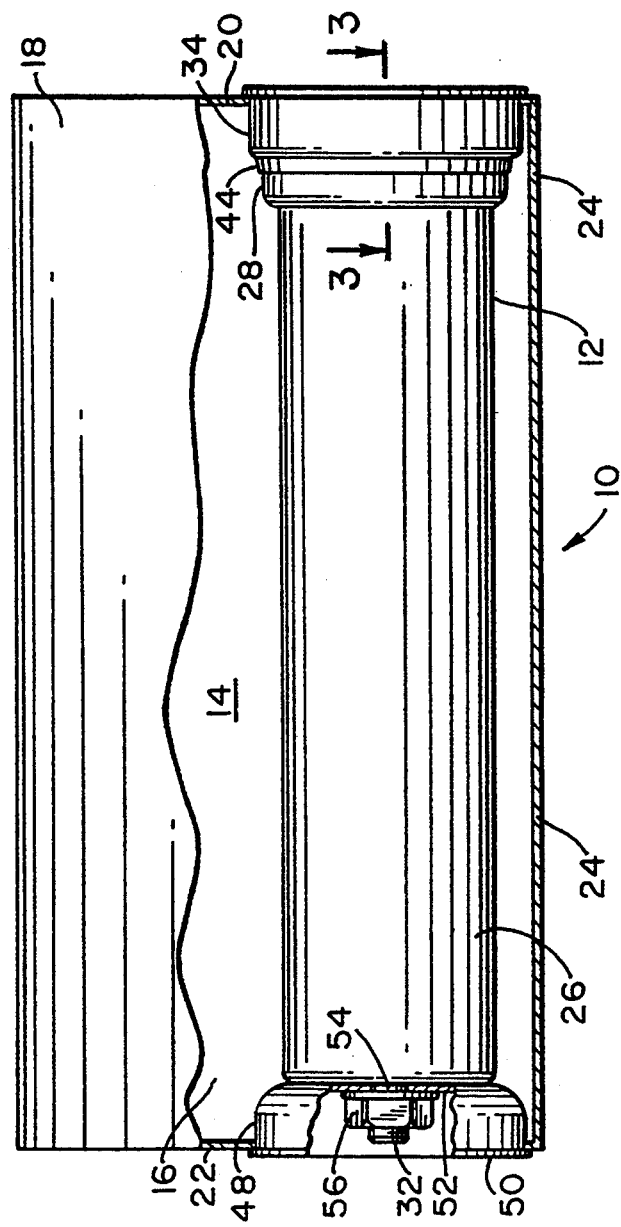
FIG. 1 is a front elevational view of a reaction can partly broken away, showing a flanged base inflator mounted therein in accordance with the present invention.

Referring to FIGS. 1 and 2, a reaction can 10 houses an inflator 12 therein along with a folded airbag (not shown) to form an airbag restraint system. The reaction can 10 houses the inflator in an internal cavity 14 formed therein. Reaction can 10 forms cavity 14 by means of sidewalls 16 and 18, generally parallel end walls 20 and 22 and bottom wall 24.

The present invention is directed to mounting the inflator 12 in the reaction can 10 in a manner such that the inflator is retained in the reaction can in an essentially shake- and rattle-free manner despite the fact that the inflator 12 is shorter in length than the length of the reaction can 10.

The inflator 12 includes a generally circular cylindrical housing 26 terminating at a first end in a flanged base 30 and terminating at the other end in a protruding threaded stud 32. The length of the inflator 12 is less than the distance between the end walls 20 and 22 of reaction can 10. Base flange 30 has a base shroud 28 element whereby the flange base 30 is attached to inflator housing 26.

Figure 3:
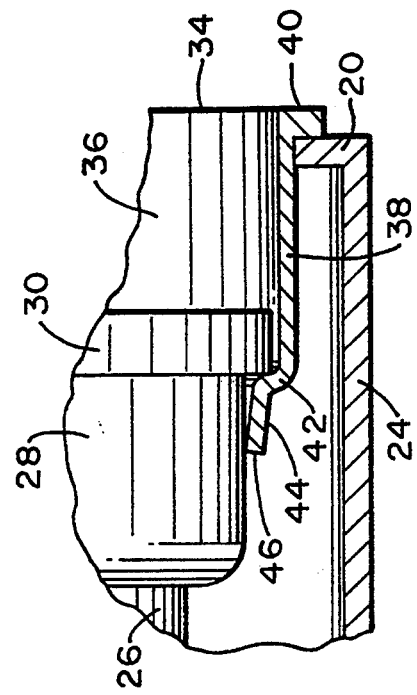
FIG. 3 is an enlarged cross-sectional view taken along lines 3—3 of FIG. 1.

The inflator is mounted in cavity 14 of reaction can 10 by mounting device or means 34. Mounting means 34 is an open generally cylindrical, circular tube having an opening or passage 36 therethrough formed by generally right circular cylindrical sidewall 38. The mounting device 34 has, at one end thereof, a cylindrical mounting flange 40 extending radially outward and at the other end an inwardly tapered conical flange 44, and preferably a formed joggle 42 terminating in said inwardly tapered conical flange 44, as best seen in FIG. 3. The radially inward (inboard) edge 46 of the tapered conical flange 44 forms a generally circular opening which is adapted to receive, engage and hold the inflator shroud 28 such that inflator flange base 30 tightly abuts joggle 42. The inside diameter of tapered conical flange 44 is slightly smaller than the outside diameter of shroud 28 so that a biased press fit is formed between tapered conical flange 44 and base shroud 28. The taper of the conical flange 44 provides a lead-in for the press fit of the tapered conical flange 44 to the inflator base shroud 28.

Mounting means 34 is placed in a suitable complimentary access opening in end wall 20 of reaction can 10 such that mounting flange 40 abuts against end wall 20, with sidewall 38, joggle 42 and conical flange 44 of mounting means 34 extending into cavity 14 of the reaction can 10. Mounting flange 40 is secured to end wall 20 by any suitable securing means, such as for example, with bolts, screws or by welding.

Although the mounting device 34 is being described as a discretely formed element that is inserted into the access opening in end wall 20 and suitably secured to said end wall 20, it will be appreciated that mounting device 34 can be formed as an integral, i.e. unitary, part of the end wall 20 of the reaction can 10.

On installation inflator 12 is inserted through opening 36 in mounting means 34 in a manner in which the end of the inflator axially opposite flanged base 30, i.e. the end of the inflator terminating in protruding threaded stud 32, is first longitudinally passed into and through the opening 36 and through conical flange 44 until inflator base flange 30 abuts and rests against joggle 42. Conical flange 44 receives and engages inflator base shroud 28 in such a manner that base flange 30 is kept in abutting relationship to joggle 42, thereby preventing any further forward movement of the inflator 12 into the cavity 14 of the reaction can 10, and the inner circumferential edge 46 of conical flange 44 grips and retains the inflator shroud 28 in a manner to prevent any substantial movement of the inflator in a rearward direction.

A secondary retention action occurs when any attempted rearward movement of the inflator 12 causes the inner edge 46 of the tapered conical flange 44 to dig into base shroud 28. The clamping face of the tapered conical flange 44 on base shroud 28 may be modified by adding cutting teeth or scallops to the inner edge 46 of the tapered conical flange 44. If desired, relief slots may be placed in tapered conical flange 44 to modify the binding force of inner edge 46 on shroud 28.

At the other end wall 22 of the reaction can 10 a cup mounting means 48 may be employed for longitudinal centering and primary retention of the inflator 12 in the reaction can 10. Cup mounting means 48 is placed in an access opening in end wall 22, with radially extending collar 50 of said cup means 48 abutting the outer surface of end wall 22. Cup means 48 has a flat bottom 52 with a shaped hole 54 thereto adapted to receive the threaded stud 32 and any index key on the threaded stud end of the inflator 12. A nut 56 is threaded onto the stud 32 thereby clamping the cup bottom 52 between the nut 56 and the end of the inflator 12. An indexing key (not shown) may be provided on the threaded stud end of the inflator to provide proper orientation of a plurality of nozzles (not shown) in the cylindrical outer housing 26 of the inflator 12 to permit proper inflation of a folded airbag (not shown) in the reaction can. Such indexing means are known in the art for achieving such proper orientation of the nozzles.

Although a mounting cup 48 may be employed at end wall 22 such a cup is not required. Rather, threaded stud 32 and any index key may simply be placed into complimentary shaped openings in end wall 22 and nut 56 is then threaded onto the stud 32 thereby clamping end wall 22 between nut 56 and the end of inflator 12. As with mounting means 34 it will be appreciated that cup means 48 may be a discretely formed element or may be formed as an integral, i.e. unitary, part of end wall 22.

The length of sidewall 38, joggle 42 and tapered conical flange 44 will be selected to securely engage the flange based inflator in the manner described, i.e. with inflator flange base 30 abutting joggle 42, tapered conical flange 44 engaging base shroud 28 and threaded stud 32 protruding through shaped hole 54 such that nut 56 can be threaded onto said stud 32.

Appropriate inward tapering of tapered conical flange 44 and the hoop stress produced by radial stretching of the circumference of inner edge 46 of tapered conical flange 44 will prevent or substantially eliminate any squeaks or rattles from occurring throughout the life of the installation.

The radial tensile strength or radially compressive forces of the inner edge 46 of the tapered conical flange 44 when the inflator is inserted therethrough, in the manner described hereinbefore, provides a reliable and long-lasting method of retaining a flange based inflator in a reaction can when the inflator is shorter in length than the length of the reaction can. In addition, the essentially 360° contact between the inner edge 46 of tapered conical flange 44 against inflator base shroud 28 provides a seal against gross gas escape at deployment. A further significant advantage of the mounting means of this invention resides in the fact that the circular cylindrical configuration of the mounting device 34 is cost effective because it lends itself to low cost fabrication methods.

Accordingly, the mounting structure of the present invention provides an excellent centering and retaining device where the inflator has a flanged base and the inflator has a dimension that is shorter than that of the reaction can into which it is to be installed. Radial compressive forces of the inwardly tapered conical flanged end of the mounting device on the inflator shroud provides a reliable and long-lasting method of retaining the inflator in an essentially squeak- and rattle-proof arrangement. Also, the contact between the mounting device 34 and the inflator 12 is such that, in addition to the centering and retaining qualities, the contact provides a seal against gas escape at deployment of the airbag of the airbag restraint assembly. The mounting structure is simple to install and cost effective in fabrication.

Additionally, the recessed cup-like structure of mounting device 34 provides for wire protection around the flanged base end, i.e. squib end, of the inflator. Also, cup 48 permits stud 32 and nut 56 to be recessed from end wall 22 at the other end of inflator 12.

Since other changes and modifications to fit particular operating requirements and environments will be apparent to those skilled in the art, the invention is not considered limited to the examples chosen for purposes of illustration and includes all changes and modifications which do not constitute a departure from the true spirit and scope of this invention as claimed in the following claims and equivalents thereto.

We claim:

1. An airbag restraint inflator assembly comprising:

a reaction can having a mounting means providing an opening in a first end wall thereof, said opening adapted to receive and position an inflator within a cavity of said reaction can;

an inflator, shorter in dimension than the reaction can, and having a generally cylindrical housing with a radially outwardly extending flanged base on a first end thereof;

said reaction can mounting means being a generally open, right circular cylindrical shaped tube formed by a circular sidewall, said sidewall terminating at one end thereof with a radially extending mounting flange having an outer diameter greater than a diameter of said first end wall opening and terminating in an inwardly tapered conical flange on the other end of said sidewall;

said mounting means being located in said reaction can first end wall with said inwardly tapered conical flange engaging and holding the inflator housing by biased radial compression force.

2. The airbag restraint inflator assembly as claimed in claim 1 wherein said inflator is terminated on a second and opposite end thereof in a threaded stud protruding through a shaped hole in a second and opposite end wall of said reaction can, said shaped hole adapted to receive said threaded stud, and a nut mounted on said stud for mounting and securing said second end of said inflator in said reaction can.

3. The airbag restraint inflator assembly as claimed in claim 2 having a mounting cup positioned in an access opening in said second end wall of said reaction can, said mounting cup having a flat bottom with a shaped opening therein for receiving the threaded stud and an index key on the second end of said inflator, said flat bottom of said mounting cup being clamped between the nut on the threaded stud and the second end of the inflator for centering and retention of the inflator in the cavity of the reaction can.

4. The airbag restraint inflator assembly as claimed in claim 1 wherein:

said mounting means further comprises a formed joggle in said sidewall intermediate said mounting flange and said inwardly tapered conical flange;

said mounting means being mounted in said reaction can first end wall with said inwardly tapered conical flange engaging and holding the inflator housing by biased radial compression force in a manner whereby the flanged base of said first end of said inflator securely abuts the formed joggle, thereby providing an essentially squeak- and rattle-free retention of said flanged base inflator in said reaction can.

5. The airbag restraint inflator assembly as claimed in claim 4 wherein said inflator is terminated on a second and opposite end thereof in a threaded stud protruding through a shaped hole in a second and opposite end wall of said reaction can, said shaped hole adapted to receive said threaded stud, and a nut mounted on said stud for mounting and securing said second end of said inflator in said reaction can.

6. The airbag restraint inflator assembly as claimed in claim 5 having a mounting cup positioned in an access opening in said second end wall of said reaction can, said mounting cup having a flat bottom with a shaped opening therein for receiving the threaded stud and an index key on the second end of said inflator, said flat bottom of said mounting cup being clamped between the nut on the threaded stud and the second end of the inflator for centering and retention of the inflator in the cavity of the reaction can.

7. An airbag restraint inflator assembly comprising:

a reaction can having an access opening in a first end wall of said reaction can, said access opening adapted to receive and position mounting means for retaining said inflator within a cavity of said reaction can;

an inflator, shorter in dimension than the reaction can, having a generally cylindrical shaped housing with a base shroud terminating in a radially outwardly extending flanged base on a first end thereof;

said mounting means positioned in said access opening of said reaction can, said mounting means having a generally open, right circular cylindrical shape formed by a circular sidewall, said sidewall terminating at one end thereof with a radially extending mounting flange having a diameter greater than a diameter of the access opening in said first end wall and having a formed joggle terminating in an inwardly tapered conical flange on the other end of said sidewall;

said mounting means being mounted in said access opening in the first end wall of said reaction can with said inwardly tapered conical flange frictionally engaging and holding the base shroud of said inflator by biased radial compressive force in a manner whereby the flanged base of said first end of said inflator securely abuts the formed joggle, thereby providing an essentially squeak- and rattle-free retention of said flanged base inflator in said reaction can.

8. The airbag restraint inflator assembly as claimed in claim 7 wherein said inflator is terminated on a second and opposite end thereof in a threaded stud protruding through a shaped hole in a second and opposite end wall of said reaction can, said shaped hole adapted to receive said threaded stud, and a nut mounted on said stud for mounting and securing said second end of said inflator in said reaction can.

9. The airbag restraint inflator assembly as claimed in claim 8 having a mounting cup positioned in an access opening in said second end wall of said reaction can, said mounting cup having a flat bottom with a shaped opening therein for receiving the threaded stud and an index key on the second end of said inflator, said flat bottom of said mounting cup being clamped between the nut on the threaded stud and the second end of the inflator for centering and retention of the inflator in the cavity of the reaction can.

10. An airbag restraint inflator assembly comprising:

a reaction can having an access opening in a first end wall of said reaction can, said access opening adapted to receive and position mounting means for retaining an inflator within a cavity of said reaction can;

an inflator, shorter in dimension than the reaction can, having a generally cylindrical housing with a base shroud terminating in a radially outwardly extending flanged base on a first end thereof and a threaded stud and index key on the second end thereof;

said mounting means positioned in said access opening of said reaction can, said mounting means having a generally open, right circular cylindrical shape formed by a circular sidewall, said sidewall terminating at one end thereof with a radially extending mounting flange having a diameter greater than a diameter of the access opening in said first end wall and having a formed joggle terminating in an inwardly tapered conical flange on the other end of said sidewall;

said mounting means being mounted in said access opening in the first end wall of said reaction can with said inwardly tapered conical flange frictionally engaging and holding the base shroud of said inflator by biased radial compressive force in a manner whereby the flanged base of said first end of said inflator securely abuts the formed joggle, thereby providing an essentially squeak- and rattle-free retention of said flanged base inflator in said reaction can.

11. A reaction can adapted to mount an inflator of the type comprising a generally cylindrical housing having a flanged base at a first end thereof and a threaded stud at a second end thereof, the reaction can comprising:

first and second end walls and first and second sidewalls defining a cavity adapted to receive an inflator;

said first end wall having inflator mounting means provided therein, said inflator mounting means including a right circular cylindrical shaped tube formed by a circular sidewall, said circular sidewall extending from said first end wall into said cavity and terminating in an inwardly tapered conical flange sized to engage and hold a flange based first end of an inflator in said cavity by biased radial compression force; and support means in said second end wall for securing a second end of said inflator.

12. A reaction can as claimed in claim 11 wherein said mounting means further comprises a formed joggle in said circular sidewall intermediate the first end wall of the reaction can and said inwardly tapered conical flange, said mounting means being mounted in said reaction can first end wall with said inwardly tapered conical flange adapted to engage and hold the inflator housing by biased radial compression force in a manner whereby the flanged base of said first end of said inflator securely abuts the formed joggle, thereby providing an essentially squeak- and rattle-free retention of said flanged base inflator in said reaction can.

13. The reaction can as claimed in claim 12 wherein said support means in said second end wall comprises a mounting cup positioned at an access opening in said second end wall, said mounting cup having a flat bottom with a shaped opening therein for receiving a threaded stud and index key on the second end of said inflator whereby the flat bottom of said mounting cup is adapted to be clamped between a nut threaded on the threaded stud and the other end of the inflator for centering and retention of the inflator in the cavity of said reaction can.

* * * * *